(12) United States Patent
Derry

(10) Patent No.: US 8,560,178 B2
(45) Date of Patent: Oct. 15, 2013

(54) SYSTEM AND METHOD FOR PROVIDING STEERING TORQUE ASSISTANCE TO AN ELECTRICALLY-POWERED STEERING APPARATUS OF A VEHICLE

(75) Inventor: Kevin L. Derry, Wheeler, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 28 days.

(21) Appl. No.: 13/307,402

(22) Filed: Nov. 30, 2011

(65) Prior Publication Data

US 2013/0138298 A1    May 30, 2013

(51) Int. Cl.
*B62D 6/00* (2006.01)
*B62D 5/04* (2006.01)

(52) U.S. Cl.
USPC ............................. 701/42; 701/41; 180/412

(58) Field of Classification Search
USPC ............. 701/41, 42, 36; 318/430, 432, 434, 318/400.15, 400.23; 180/412, 413, 415, 180/416, 422, 443, 444, 446, 447; 280/5.51
See application file for complete search history.

(56) References Cited

U.S. PATENT DOCUMENTS

| | | | |
|---|---|---|---|
| 4,708,220 A * | 11/1987 | Noto et al. ................... | 180/446 |
| 7,792,619 B2 * | 9/2010 | Uryu ............................... | 701/41 |
| 2003/0221900 A1* | 12/2003 | Bolourchi et al. ............ | 180/446 |
| 2004/0019419 A1* | 1/2004 | Teramoto ....................... | 701/41 |
| 2005/0040781 A1* | 2/2005 | Nagase et al. ................ | 318/432 |
| 2008/0048591 A1* | 2/2008 | Hamada et al. ............... | 318/9 |

* cited by examiner

*Primary Examiner* — Mary Cheung
*Assistant Examiner* — Rodney Butler
(74) *Attorney, Agent, or Firm* — Cantor Colburn LLP

(57) ABSTRACT

A system for providing steering torque assistance to an electrically-powered steering apparatus comprises a torque assistance motor coupled to the steering apparatus. A steering controller is configured to cause the torque assistance motor to apply a commanded level of steering torque assistance to the steering apparatus. The steering controller is configured to determine the commanded level of steering torque assistance based on a product of a scheduled level of steering torque assistance and a torque assistance scale factor, wherein the scheduled level of steering torque assistance is determined from a scheduled torque assistance characteristic having a nominal assist. The steering controller is configured to determine a scaled assist based on feedback from one or more safety sensors; and the torque assistance scale factor is determined as a ratio of the scaled assist and the nominal assist.

20 Claims, 3 Drawing Sheets

SYSTEM AND METHOD FOR PROVIDING STEERING TORQUE ASSISTANCE TO AN ELECTRICALLY-POWERED STEERING APPARATUS OF A VEHICLE

BACKGROUND OF THE INVENTION

The present invention relates generally to systems and methods for providing steering torque assistance to an electrically-powered steering apparatus of a vehicle and more specifically to a system and method for providing steering torque assistance to an electrically-powered steering apparatus of a vehicle in which torque assistance is provided in a continuous manner despite the implementation of torque-clipping.

In a conventional electric steering system, a vehicle operator may experience a requirement for an approximately constant level of operator-supplied hand-wheel torque throughout a full range of hand-wheel rotation until the hand-wheel, and/or the vehicle steering apparatus, reaches a physical limit. From the perspective of the vehicle operator, as long as no physical limitation is active, the hand-wheel responds to the operator's application of torque by traveling until the limit is encountered. Once the limit is reached, further application of torque by the operator does not result in further rotation of the steering wheel.

In an electrically assisted power steering system, it can be important to protect system components from overheating or other potentially detrimental conditions. In some systems, it has been observed that accumulated effects of various steering maneuvers may cause overheating or other issues if preventative measures are not implemented. One form of preventative measure involves over-riding commanded levels of steering assist so as to reduce loads (e.g., thermal loads, forces, fatigue, etc.) imposed on critical system components. When commanded levels of torque for assisting steering are over-ridden, the torque assistance is said to be de-rated. When torque assistance is de-rated, increased torque is required from the operator to rotate the hand-wheel to perform a particular maneuver with the vehicle.

Unfortunately, in some cases, the implementation of such protective, torque-limiting measures (i.e., de-rating) may tend to reduce system outputs in ways that negatively impact the operability or reliable feel of the steering system and thus the drivability of the vehicle. For example, one system and method imposes a maximum limit on torque assistance without otherwise affecting torque output so long as commanded levels of torque fall below the maximum limit.

In accordance with such torque-clipping systems and methods, as long as a driving maneuver does not require maximum assist from the torque assistance mechanism, a vehicle operator will not perceive any decrease in anticipated steering system performance. In effect, since the vehicle operator doesn't need maximum assist, the vehicle operator will receive all the steering assist the vehicle operator expects. However, as soon as the vehicle operator attempts to perform a steering maneuver that would normally call for a level of torque assistance that exceeds a de-rated, or clipped, maximum torque limit, the torque assistance provided by the system remains relatively fixed at the maximum allowed (i.e., clipped or de-rated) level.

From the perspective of an operator of a vehicle equipped with such a torque-clipping system, the level of torque input required from the vehicle operator in order to complete the maneuver suddenly increases in a perceptibly discontinuous manner. In such situations, even though the vehicle may have appeared to the operator to have been operating in a normal fashion, the vehicle may abruptly fail to respond as anticipated without the operator's input of increased hand-wheel torque. This characteristic can create the perception in the operator that the steering apparatus may have reached its travel limit when, in fact, it has not.

In addition, with conventional de-rating, the operator may experience a discontinuous relationship between hand-wheel input torque, resulting rotation of the hand-wheel, and turning rate of the vehicle. Put another way, conventional steering torque assistance systems may cause the operator to experience an ever-increasing level of hand-wheel torque required to rotate the hand-wheel (i.e., to turn the vehicle) at hand-wheel positions beyond the point at which a de-rated torque assistance limit is encountered, and such undesirable conditions may exist even though the steering apparatus has not reached an actual physical limit.

In some systems, clipping may be imposed only when one or more system criteria, such as thermal-related system criteria, are met. Such steering systems may produce a first set of response characteristics when the criteria are not satisfied (e.g., on cold days) and a completely different set of response characteristics when the criteria are met (e.g., on hot days, under extreme driving conditions). Still further, response characteristics of such protected systems (e.g., thermally-protected systems) may change abruptly from a non-torque-limited mode to a limited-torque mode and back to a non-limited mode within a single driving session. In such systems, the full steering torque assistance may be available until thermal limit clips the maximum output. When clipping occurs, however, there may be an abrupt, unanticipated loss of steering torque assistance, which the vehicle operator may perceive as an unexpected loss in responsiveness of the vehicle.

Accordingly, it is desirable to have a system and method for providing steering torque assistance, in which torque assistance is provided in a continuous manner despite the implementation of torque-clipping.

SUMMARY OF THE INVENTION

A system for providing steering torque assistance to an electrically-powered steering apparatus of a vehicle comprises a torque assistance motor coupled to the steering apparatus and a steering controller in communication with the torque assistance motor. The steering controller is configured to cause the torque assistance motor to apply a commanded level of steering torque assistance to the steering apparatus. The torque assistance motor is positioned and configured so as to apply the commanded level of steering torque assistance to the steering apparatus in response to commands from the steering controller. The steering controller is configured to determine the commanded level of steering torque assistance based on a product of a scheduled level of steering torque assistance and a torque assistance scale factor. The scheduled level of steering torque assistance is determined from a scheduled torque assistance characteristic having a nominal assist. The steering controller is configured to determine a scaled assist based on feedback from one or more safety sensors, and the torque assistance scale factor is determined as a ratio of the scaled assist and the nominal assist.

A method for providing steering torque assistance to an electrically-powered steering apparatus of a vehicle comprises providing a torque assistance motor coupled to the steering apparatus and determining a scheduled level of steering torque assistance from a scheduled torque assistance characteristic having a nominal assist. A scaled assist is determined based on feedback from one or more safety sensors, and a torque assistance scale factor is determined as a ratio of the scaled assist and the nominal assist. A commanded level of steering torque assistance is determined based on a product of the scheduled level of steering torque assistance and the torque assistance scale factor, and the torque assistance motor is caused to apply the commanded level of steering torque assistance to the steering apparatus.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
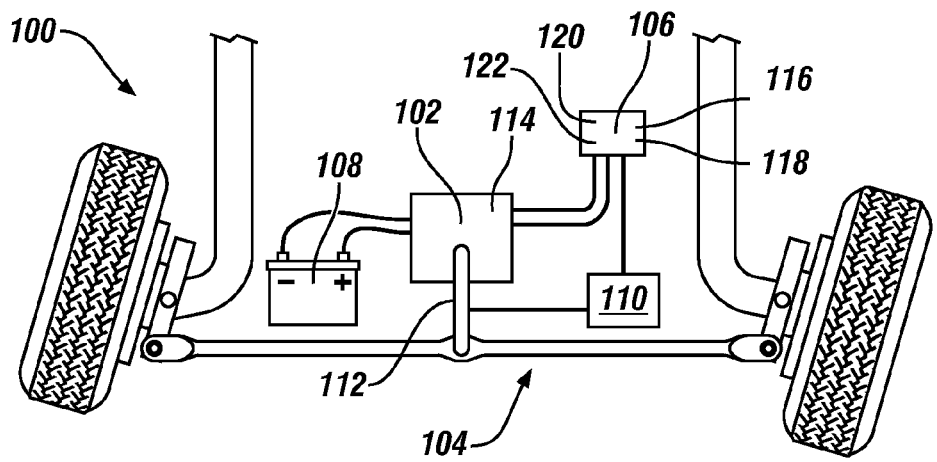
FIG. 1 is a drawing of an exemplary system for providing torque assistance to a vehicle steering apparatus.

Referring now to the Figures, where the invention will be described with reference to specific embodiments, without limiting same, in an exemplary embodiment, as shown in FIG. 1, a system 100 for providing torque assistance to a steering apparatus of a vehicle includes torque assistance motor 102 that is coupled to a steering apparatus 104. The torque assistance motor 102 is coupled to, and controlled by, a steering controller 106. The torque assistance motor 102 is also coupled to an electrical power supply 108 and is positioned and configured so as to apply a commanded level of steering torque assistance to the steering apparatus 104. One or more torque output sensors 110 are positioned and configured so as to provide feedback signals to the steering controller 106. The feedback signals are indicative of the level of torque provided by the torque assistance motor 102 and/or the total magnitude of torque applied to the steering apparatus 104. In an exemplary embodiment, a torque output sensor 110 comprises a strain gage positioned on an output shaft 112 of the torque assistance motor 102 and configured for detecting strain in the output shaft 112. In accordance with such embodiments, the steering controller 106 is configured for interpreting signals from the strain gage as steering torque assistance provided to the steering apparatus 104.

It should be appreciated that a total magnitude of torque applied to the steering apparatus 104 is approximately equal to the sum of a quantity of hand-wheel torque applied by a vehicle operator to the hand-wheel and the quantity of steering torque assistance provided by the torque assistance motor 102. Similarly, a quantity of torque required to be applied to the vehicle hand-wheel by the vehicle operator in order to perform a desired vehicle maneuver is approximately equal to the difference between the total magnitude of torque required by the steering apparatus 104 in order to complete the maneuver and the quantity of steering torque assistance provided by the torque assistance motor 102.

In an exemplary embodiment, one or more system safety sensors 114 are positioned and configured so as to provide feedback signals to the steering controller 106. Signals provided by the one or more system safety sensors 114 are indicative of relevant safety parameters associated with the steering apparatus 104 and the torque assistance motor 102. For example, in an exemplary embodiment, a safety sensor 114 may comprise a temperature sensor, such as a thermocouple, positioned within the casing of the torque assistance motor 102 adjacent to temperature sensitive components such as electrical motor windings of the torque assistance motor 102.

In an exemplary embodiment, the steering controller 106 is configured to receive and process feedback signals that are indicative of the level of torque provided by the torque assistance motor 102. In an exemplary embodiment, the steering controller 106 is also configured to receive and process signals provided by the one or more system safety sensors 114. The steering controller 106 comprises a processor 116 coupled to a memory storage device 118 and is configured to perform a duty-cycle function wherein signals indicative of parameters related to the steering assist motor (e.g., filter counts, speed, revolutions, torque, current, voltage, and temperature) are received as inputs, and wherein a duty-cycle scale factor is determined based on those inputs.

In an exemplary embodiment, the steering controller 106 includes a duty cycle manager 120 configured for receiving signals indicative of parameters related to the steering assist motor (e.g., filter counts, speed, revolutions, torque, current, voltage, and/or temperature) and for producing the duty-cycle scale factor based on those inputs according to a suitable methodology designed to protect the steering apparatus 104 and the torque assistance motor 102 from undesirable conditions such as overheating. In an exemplary embodiment, the duty-cycle scale factor is based on filter counts. In an exemplary embodiment, the scale factor is based on the maximum filter count of only slow responding duty cycle filters.

Figure 3:
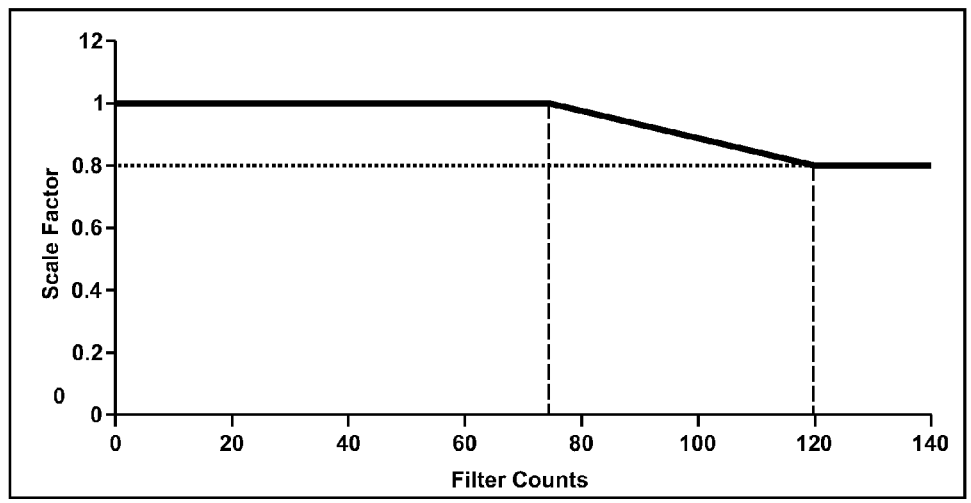
FIG. 3 is a chart showing an exemplary relationship between an assist scale factor and duty-cycle filter counts.

FIG. 3 illustrates an exemplary relationship between a duty-cycle scale factor for steering torque assistance and duty-cycle filter counts. As shown in FIG. 3, a duty-cycle scale factor for steering torque assistance remains at a level of approximately 1.0 for a range of duty-cycle filter counts extending from zero filter counts to 75 filter counts, which corresponds to a condition wherein it may be desirable to initiate de-rating of the torque assistance to be provided to the steering apparatus 104. Between 75 filter counts and 120 filter counts, the duty-cycle scale factor for steering torque assistance decreases approximately linearly until it reaches a scale factor value of approximately 0.8. The exemplary duty-cycle scale factor remains at this value of 0.8 for all filter counts greater than 120.

It should be noted that the relationship between filter counts and the corresponding duty-cycle scale factor may also be retained by the steering controller 106 as a simplified calibration table wherein the calibration table indicates the highest filter count at which the duty-cycle scale factor is equal to 1.0 (i.e., non-scaled conditions) as well as the filter count at which the duty-cycle scale factor corresponds to a fully depreciated value (i.e., a firewall condition). While more complex relationships are possible, in accordance with a simplified embodiment, the relationship between filter counts and the corresponding duty-cycle scale factor is approximately linear in the three regions defined by the two above-described values for duty-cycle filter count.

In embodiments wherein one or more thermal sensor is used to affect the de-rated maximum assist limit (i.e., the scaled assist), a scale factor, such as the above-described duty-cycle scale factor, can be applied so as to effectively de-rate torque assistance at levels below the thermal limit so as to provide a warning to the vehicle operator that thermal limit may soon be reached. As torque assistance is scaled, the vehicle operator senses the need to supply manageably increased levels of steering torque in order to complete a maneuver. Thus, torque assistance is scaled at torque levels lower than the torque levels at which steering torque assistance is to be clipped. In an exemplary embodiment, the duty-cycle scale factor is related to the ratio between a scaled assist and the system's nominal (non-de-rated) maximum assist limit (i.e., nominal assist) at levels of assist up to the scaled assist. It should be appreciated that the scale factor may be calibrated in order to reflect sensed instantaneous or accumulated thermal conditions.

The steering controller 106 is also configured to perform a torque assistance function wherein a commanded level of torque assistance is to be determined. Relevant inputs to the torque assistance function include hand-wheel position, hand-wheel rate of rotation, output torque, and vehicle speed. In an exemplary embodiment, the steering controller 106 includes a torque assistance manager 122 configured for receiving signals indicative of relevant parameters for determining a torque assistance level to be commanded (e.g., hand-wheel position, hand-wheel rate of rotation, output torque, vehicle speed, and duty-cycle scale factor) and for producing the steering torque assistance command based on those inputs according to a suitable methodology designed to provide a suitable level of control and feel for the vehicle operator while respecting operating system limitations imposed for safety (e.g., based on outputs from the duty cycle manager 120).

Figure 4:
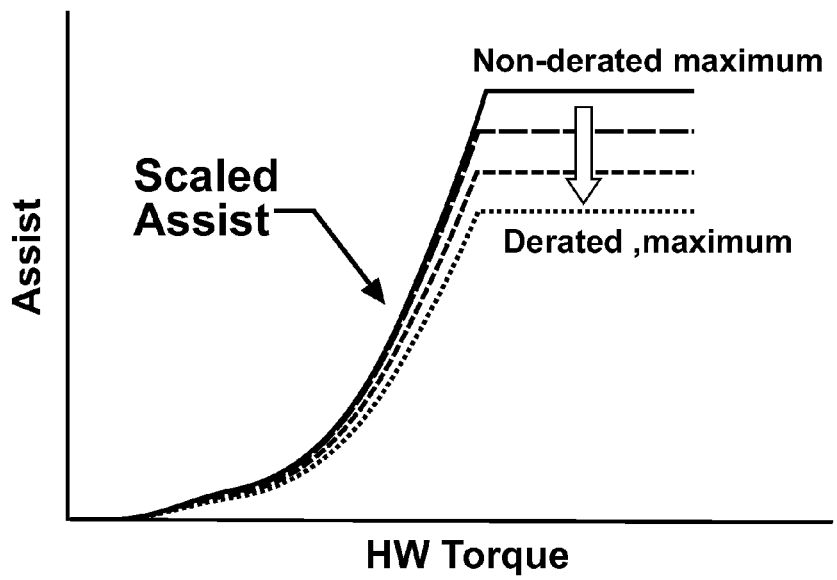
FIG. 4 is a chart showing an exemplary relationship between scaled assist and hand-wheel torque.

In accordance with outputs from the duty-cycle manager, the commanded torque assistance level may be scaled by the above-described duty-cycle scale factor so as to protect system components or so as to provide for a desirable operating feel characteristic in terms of the quantities of torque required to be applied to the vehicle hand-wheel by the vehicle operator. Thus, in an exemplary embodiment, a level of torque assistance provided by the torque assistance motor 102 is reduced according to the product of one or more torque assistance scale factors, resulting in reductions in torque assistance even though the actual magnitudes of steering torque assistance are at levels less than the torque limit. The one or more torque assistance scale factors may be configured so as to achieve or enable an operator to perceive a desired relationship between hand-wheel torque and hand-wheel rotational position. In an exemplary embodiment, the system is controlled with the intention to improve upon the driving experience by scaling assist torque. Accordingly, motor current is modulated so as to achieve desired levels of assist torque. FIG. 4 illustrates an exemplary relationship between steering torque assistance and hand-wheel torque. As shown in FIG. 4, a torque assistance scale factor is effective to de-rate steering torque assistance at torque levels lower that the torque levels at which steering torque assistance is to be clipped.

Figure 5:
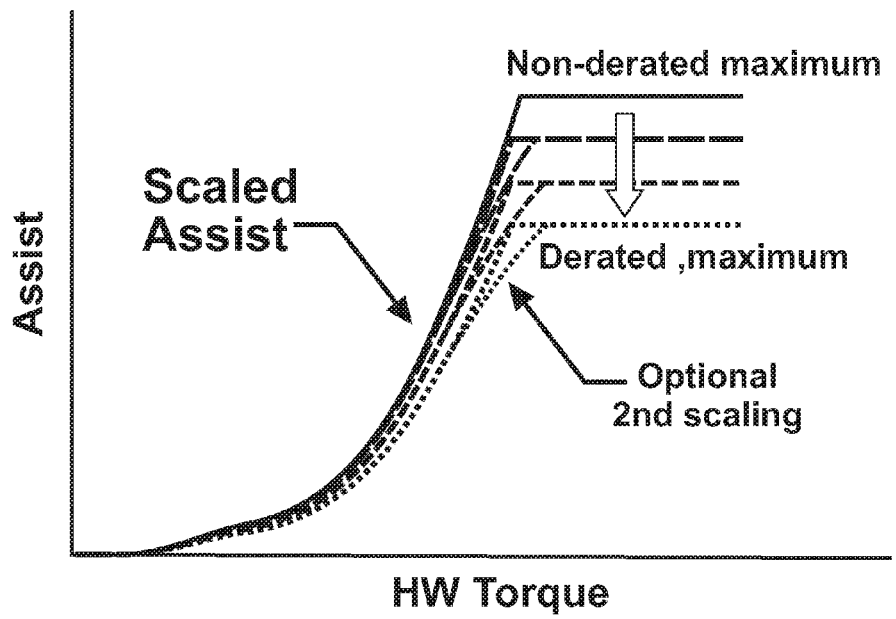
FIG. 5 is chart showing an exemplary relationship between scaled assist and handwheel torque as actual torque assistance approaches the clipped torque assistance limit asymptotically or nearly asymptotically.

In addition, in an exemplary embodiment the torque assistance manager 122 may be configured to determine a second-order torque assistance scale factor so as to further smooth the transition from low-assist conditions to high-assist conditions. This additional torque assistance scale factor is calibrated as a function of the difference between scaled assist and the level of requested assist. Low levels of assist are unchanged, but levels of assist approaching the de-rated limit are scaled to de-rated values. For example, as shown in FIG. 5, one such relationship results in continuous increases in required hand-wheel torque as actual torque assistance approaches the clipped torque assistance limit asymptotically or nearly asymptotically.

Figure 6:
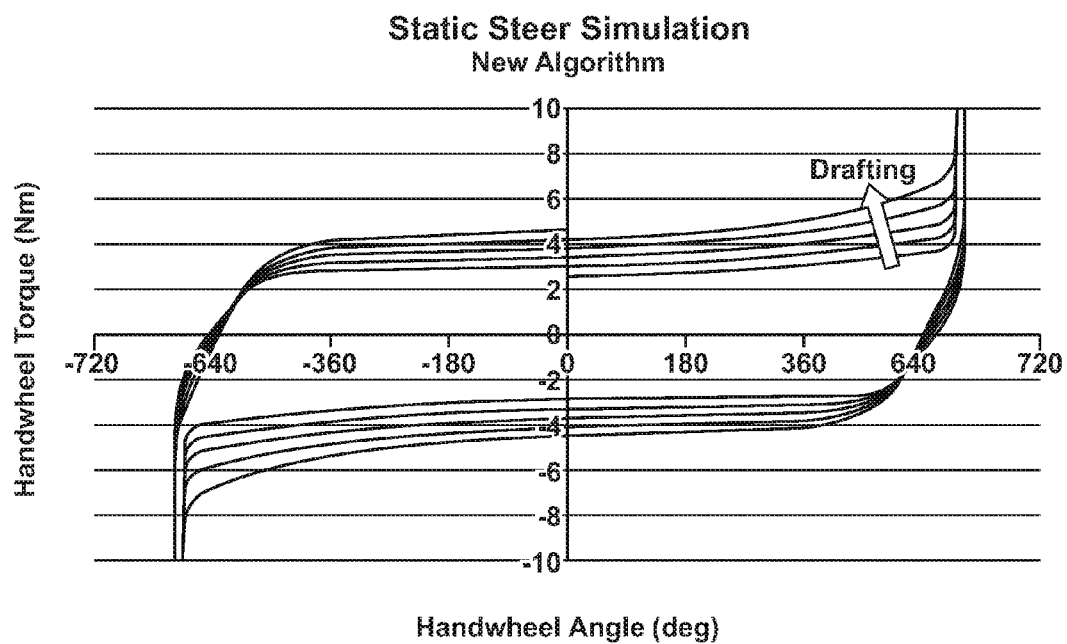
FIG. 6 is a chart showing an exemplary relationship between required handwheel torque and hand-wheel position at various levels of assist scaling/de-rating.

In accordance with the invention, as shown in FIG. 6, the level of de-rating is implemented throughout the range of torques applied to the hand-wheel. As a result, an operator may be enabled to perceive a relatively constant level of required hand-wheel torque throughout a range of hand-wheel rotational positions despite the presence of de-rating. It is anticipated that research will produce enhanced systems and methods for protecting the steering system. The invention provides a system and method for implementing those enhanced systems and methods for protecting the steering system while enhancing the driving experience and maintaining operator ability to respond to changes in system responses as protective measures are implemented.

Thus, exemplary methods comprise applying a torque assistance scale factor throughout a range of torque assistance levels rather than merely clipping the torque assistance at a maximum value. In an exemplary embodiment, the torque assistance scale factor is related to the difference between scaled assist (i.e., asymptote) and the system's normal (non-de-rated) maximum assist limit, which may be a constant torque level. The scaled assist (i.e., asymptote) is calculated and updated periodically based on logic and data associated with operation of a particular system. Whenever the scaled assist (i.e., asymptote) is updated, the torque assistance scale factor can also be updated.

In an exemplary embodiment, the system and method is configured so as to create a subtle transition from normal performance to de-rated performance. The system provides feedback to the vehicle operator that the system is de-rating even during maneuvers requiring relatively low levels of assist. Vehicle operator input torque increases at all conditions, and continues to increase as the system progresses deeper into its state of self-protection. The desired steering feel, when in a de-rated state, is accomplished through scaling of the requested torque-assist. Conceptually, the torque assistance scale factor is related to the difference between scaled assist and the system's normal (non-de-rated) maximum assist limit. The normal limit is a constant, while the de-rated limit is calculated and updated periodically. In an exemplary embodiment, this scale factor does not rely on Duty Cycle filter counts, but rather on the proximity of steering torque assistance to the steering torque assistance limit. Based on the ratio of those values, a scale factor is determined by interpolation of calibration tables.

This additional, second-order scaling operation can further smooth transition from low-assist conditions to maximum-assist conditions. This additional scale factor is calibrated as a function of the difference between scaled assist and the level of requested assist. Low levels of assist are unchanged, but levels of assist approaching the de-rated limit are scaled downward. Conventional systems provide full assist until Thermal Limit clips the maximum output. When clipping occurs, the vehicle operator feels an abrupt, unanticipated loss of assist. In an exemplary embodiment, assist is scaled back prior to Thermal Limit as a means of warning the vehicle operator that Thermal Limit is approaching. As assist is scaled back, the vehicle operator feels increased but manageable levels of steering torque.

Finally, the steering controller 106 is also configured to perform a maximum torque assistance limiting function wherein the commanded level of torque assistance determined by the torque assistance manager 122 may be limited or capped at a maximum torque assistance level. The maximum torque assistance limiting function is based on a simple comparison of the commanded level of torque assistance against a maximum torque assistance level. The maximum torque assistance level may be a predetermined value stored in memory storage device 118 or may be determined based on feedback such as learned relationships between steering system temperatures and steering torque assistance values.

Figure 2:
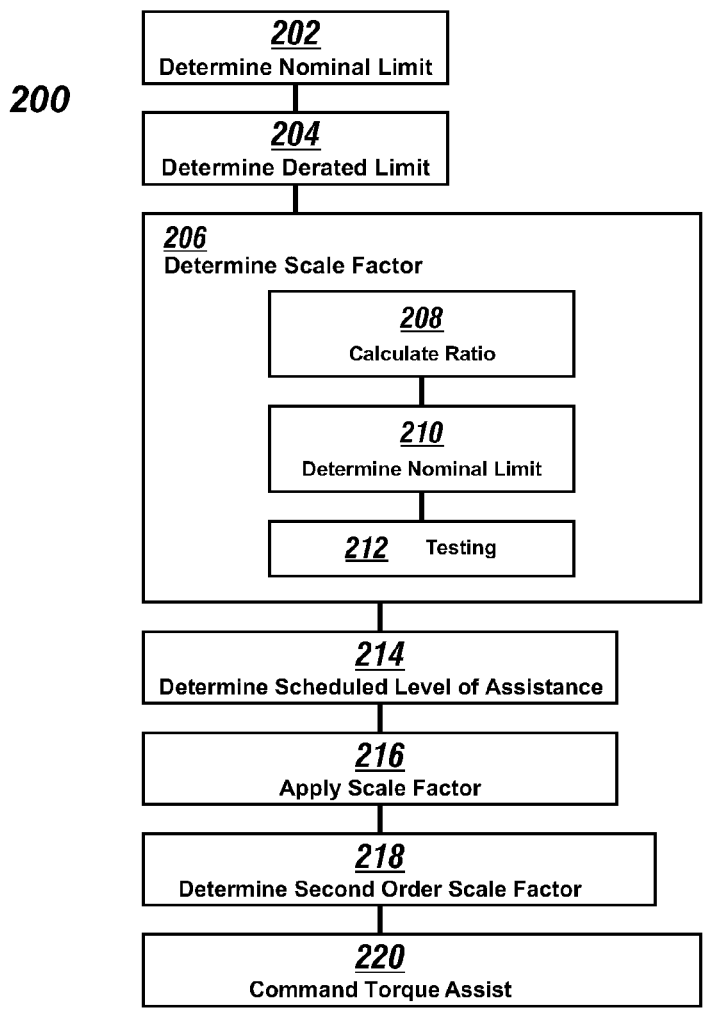
FIG. 2 is a flow diagram showing an exemplary method for providing torque assistance to a vehicle steering apparatus.

As shown in FIG. 2, in an exemplary embodiment, a method 200 for providing torque assistance to a steering apparatus of a vehicle that includes torque assistance motor coupled to a steering apparatus includes determining a nominal (i.e., non-de-rated) maximum torque assistance limit (step 202). This value may be determined from a schedule stored in memory of the steering controller or may be determined through experience by the controller. The method 200 also includes determining the scaled assist (i.e., asymptote), toward which a steering torque assistance approaches as increasingly significant steering maneuvers are performed (step 204). The method 200 also includes determining a scale factor based on the difference between the scaled assist (i.e., the asymptote) and the system's nominal (non-de-rated) maximum assist limit (step 206).

In an exemplary embodiment, the scale factor is determined based on the ratio of the scaled assist (i.e., the asymptote) and the system's nominal (non-de-rated) maximum assist limit (step 208). Alternatively, in another exemplary embodiment, the scale factor is determined by reference to an empirical relationship between the scale factor and the difference between scaled assist (i.e., the asymptote) and the nominal (non-de-rated) maximum assist limit of the system (step 210). In an exemplary embodiment such a relationship may be established based on testing of operator interactions with vehicles wherein different levels and characteristics of de-rating are evaluated (step 212).

In an exemplary embodiment a method 200 for providing torque assistance to a steering apparatus of a vehicle further includes determining a scheduled level of steering torque assistance (step 214). In an exemplary embodiment, this may be determined from a scheduled torque assistance characteristic, which may also exhibit a nominal maximum assist limit (i.e., a nominal assist) as described above. In the presence of de-rating, the scheduled level of torque assistance may be scaled so as to provide a suitable level of control and feel for the vehicle operator while respecting operating system limitations imposed for safety. Such limitations may be based on system temperatures or duty-cycle parameters. In an exemplary embodiment, a suitable level of control and feel for the vehicle operator corresponds to a substantially constant level of required operator hand-wheel torque as a function of hand-wheel position within a range of hand-wheel positions.

In another exemplary embodiment, a suitable level of control and feel for the vehicle operator corresponds to slopes of required operator hand-wheel torque as a function of hand-wheel position within a range of hand-wheel positions wherein the slopes are less than a predetermined limit. In another exemplary embodiment, a suitable level of control and feel for the vehicle operator corresponds to levels of required operator hand-wheel torque as a function of hand-wheel position within a range of hand-wheel positions wherein the relationships are continuous so as to avoid discontinuous changes in slope of the relationship. For example, a discontinuous change in slope may be characterized by a change in slope that exceeds 10 percent over 15 degrees of rotation of the hand-wheel. Another such discontinuous change in slope may be characterized by a change in slope that exceeds 20 percent over 15 degrees of rotation of the hand-wheel. Another such discontinuous change in slope may be characterized by a change in slope that exceeds 30 percent over 15 degrees of rotation of the hand-wheel.

In an exemplary embodiment a method 200 for providing torque assistance to a steering apparatus of a vehicle further includes applying the duty-cycle scale factor to the commanded level of torque assistance (step 216). This step of scaling the scheduled level of torque assistance may be performed even where the maneuver being performed may not, at that instant, call for clipping of the torque assistance. Thus, a scaled level of steering torque assistance is commanded, and the scaling is applied, even though the maneuvers being performed may require levels of steering torque assistance that are less than levels that would typically necessitate reductions in output torque, such as to avoid overheating or other detrimental operating conditions.

In an exemplary embodiment a method 200 for providing torque assistance to a steering apparatus of a vehicle further includes determining a second-order scale factor so as to further smooth the transition from low-assist conditions to high-assist conditions (step 218). This additional scale factor is calibrated as a function of the difference between scaled assist and the level of requested assist. Low levels of assist are unchanged, but levels of assist approaching the de-rated limit are scaled to de-rated values. Once suitably determined scale factors have been determined so as to meet applicable criteria such as safety and drivability as described herein, a steering assist level may be commanded so as to cause the torque assistance motor to apply the commanded level of torque assistance to the steering apparatus (step 220).

Accordingly a system 100 and a method 200 for controlling the output of a torque assistance motor produce a more subtle (more continuous, less discontinuous, less surprising, smoothed) transition from a normal output mode to a reduced (de-rated) output mode. The exemplary system 100 and method 200 provide feedback enabling a vehicle operator to sense when the system is de-rating even though the maneuvers being performed require levels of assist that are less than levels that would typically necessitate reductions in output torque, such as to avoid overheating or other detrimental operating conditions. As output from the torque assistance motor becomes increasingly insufficient to perform a desired vehicle maneuver, torque input required from the operator in order to complete the desired maneuver increases. By increasing requirements for torque input from the operator at maneuver conditions other than peak conditions, the operator is enabled to sense the de-rating of torque assistance and to anticipate further de-rating as a maneuver proceeds. In addition, the transition from maneuvers requiring torque levels lower than the limit to maneuvers requiring torque levels greater than the limit can be smoothed so as to correspond to a continuous relationship between operator-provided torque and either hand-wheel position or vehicle turning rate or vehicle wheel orientation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of

Having thus described the invention, it is claimed:

1. A system for providing steering torque assistance to an electrically-powered steering apparatus of a vehicle, the system comprising:
    one or more safety sensors;
    a torque assistance motor coupled to the electrically-powered steering apparatus; and
    a steering controller in communication with the torque assistance motor;
    the steering controller being configured to cause the torque assistance motor to apply a commanded level of steering torque assistance to the electrically-powered steering apparatus;
    the torque assistance motor being positioned and configured so as to apply the commanded level of steering torque assistance to the electrically-powered steering apparatus in response to commands from the steering controller;
    the one or more safety sensors positioned and configured so as to provide a feedback signal to the steering controller, the feedback signal being indicative of a safety parameter associated with the electrically-powered steering apparatus or the torque assistance motor;
    the steering controller being configured to determine the commanded level of steering torque assistance based on a product of a scheduled level of steering torque assistance and a torque assistance scale factor;
    the scheduled level of steering torque assistance being determined from a scheduled torque assistance characteristic having a nominal assist;
    the steering controller being configured to determine a scaled assist based on the feedback signal, the scaled assist configured for respecting a predefined system limitation; and
    the torque assistance scale factor being determined as a ratio of the scaled assist and the nominal assist.

2. The system of claim 1, wherein the one or more safety sensors comprises a thermal sensor.

3. The system of claim 1, wherein the scale factor is applied so as to de-rate torque assistance at levels below a thermal limit.

4. The system of claim 1, wherein the steering controller is configured to limit the commanded level of steering torque assistance to a scaled assist.

5. The system of claim 1, wherein a relationship between the commanded level of steering torque assistance and hand-wheel position is continuous as the commanded level of steering torque assistance approaches the scaled assist.

6. The system of claim 1, wherein the torque assistance motor is coupled to an electrical power supply.

7. The system of claim 1, wherein one or more torque output sensors are positioned and configured so as to provide feedback signals to the steering controller indicative of steering torque assistance.

8. The system of claim 6, wherein the feedback signals are indicative of a level of assistance torque provided by the torque assistance motor.

9. The system of claim 6, wherein the feedback signals are indicative of a total magnitude of torque applied to the steering apparatus.

10. The system of claim 6, wherein a torque output sensor comprises a strain gage positioned on an output shaft of the torque assistance motor and configured for detecting strain in the output shaft and wherein the steering controller is configured for interpreting signals from the strain gage as steering torque assistance provided to the steering apparatus.

11. The system of claim 1, wherein the one or more safety sensors comprises a temperature sensor.

12. A method for providing steering torque assistance to an electrically-powered steering apparatus of a vehicle comprising:
    providing a torque assistance motor coupled to the steering apparatus;
    providing one or more safety sensors positioned and configured so as to provide a feedback signal indicative of a safety parameter associated with the electrically-powered steering apparatus or the torque assistance motor;
    determining a scheduled level of steering torque assistance from a scheduled torque assistance characteristic having a nominal assist;
    determining a scaled assist based on the feedback signal, the scaled assist configured for respecting a predefined system limitation;
    determining a torque assistance scale factor as a ratio of the scaled assist and the nominal assist;
    determining a commanded level of steering torque assistance based on a product of the scheduled level of steering torque assistance and the torque assistance scale factor; and
    causing the torque assistance motor to apply the commanded level of steering torque assistance to the steering apparatus.

13. The method of claim 12,
    wherein the one or more safety sensors comprises a thermal sensor; and
    wherein the step of determining a scaled assist is performed so that the scaled assist is configured for respecting a predefined thermal limitation.

14. The method of claim 12, further comprising limiting the commanded level of steering torque assistance to a scaled assist.

15. The method of claim 12, wherein a relationship between the commanded level of steering torque assistance and hand-wheel position is continuous as the commanded level of steering torque assistance approaches the scaled assist.

16. The method of claim 12, wherein the step of causing the torque assistance motor to apply the commanded level of steering torque assistance to the steering apparatus is performed by modulating a supply of electrical power provided to the torque assistance motor.

17. The method of claim 12, further comprising providing feedback signals to the steering controller indicative of steering torque assistance.

18. The method of claim 17, wherein the feedback signals are indicative of a level of assistance torque provided by the torque assistance motor.

19. The method of claim 17, wherein the feedback signals are indicative of a total magnitude of torque applied to the steering apparatus.

20. The method of claim 17, wherein a torque output sensor comprises a strain gage positioned on an output shaft of the torque assistance motor and configured for detecting strain in the output shaft and wherein the steering controller is configured for interpreting signals from the strain gage as steering torque assistance provided to the steering apparatus.

* * * * *